(12) United States Patent
Stearns et al.

(10) Patent No.: US 9,010,038 B1
(45) Date of Patent: Apr. 21, 2015

(54) TILE ROOF MOUNT

(71) Applicant: Vermont Slate & Copper Services, Inc., Morrisville, VT (US)

(72) Inventors: Brian Cecil Stearns, Stowe, VT (US); Alexander Grant Bornemann, Wolcott, VT (US)

(73) Assignee: Vermont Slate & Copper Services, Inc., Morrisville, VT (US)

( * ) Notice: Subject to any disclaimer, the term of this patent is extended or adjusted under 35 U.S.C. 154(b) by 0 days.

(21) Appl. No.: 14/530,995

(22) Filed: Nov. 3, 2014

Related U.S. Application Data

(60) Provisional application No. 62/036,505, filed on Aug. 12, 2014, provisional application No. 61/935,907, filed on Feb. 5, 2014, provisional application No. 61/911,987, filed on Dec. 4, 2013.

(51) Int. Cl.
| | |
|---|---|
| *E04D 13/18* | (2014.01) |
| *E04D 13/00* | (2006.01) |
| *E04B 1/41* | (2006.01) |
| *F16M 13/02* | (2006.01) |
| *E04B 1/38* | (2006.01) |

(52) U.S. Cl.
CPC . *E04D 13/00* (2013.01); *E04B 1/40* (2013.01); *E04B 2001/405* (2013.01); *F16M 13/02* (2013.01)

(58) Field of Classification Search
CPC ..... E04D 13/00; E04B 1/20; E04B 2001/405; F16M 13/02; A47B 95/008; A47B 96/06; A47B 96/061; A47F 5/0823; A47F 5/0869
USPC .......................................... 52/173.3; 403/329
See application file for complete search history.

(56) References Cited

U.S. PATENT DOCUMENTS

| | | | | |
|---|---|---|---|---|
| 5,398,476 | A | * | 3/1995 | Knight ............................ 52/698 |
| 6,168,125 | B1 | * | 1/2001 | Winger et al. ............. 248/228.3 |
| 7,175,140 | B2 | * | 2/2007 | Johnson et al. ............... 248/148 |
| 2009/0044854 | A1 | * | 2/2009 | Placer et al. .................. 136/251 |

* cited by examiner

*Primary Examiner* — Charles A Fox
*Assistant Examiner* — Patrick Maestri
(74) *Attorney, Agent, or Firm* — Michael Best & Friesrich LLP

(57) ABSTRACT

A roof mounting system is mounted to roofing tile. The roof mounting system includes a first bracket portion having a first elongate portion, a first hook portion and a first leg. The first hook portion engages a first side of the roofing tile. The roof mounting system also includes a second bracket portion having a second elongate portion, a second hook portion and a second leg. The second hook portion engages a second side of the roofing tile. The roof mounting system further includes a slotted plate that connects the first and the second bracket portions by engaging the first and the second legs. The roof mounting system further includes a standoff connected to either the first bracket portion or the slotted plate. The standoff supports one or more components on the roof.

20 Claims, 20 Drawing Sheets

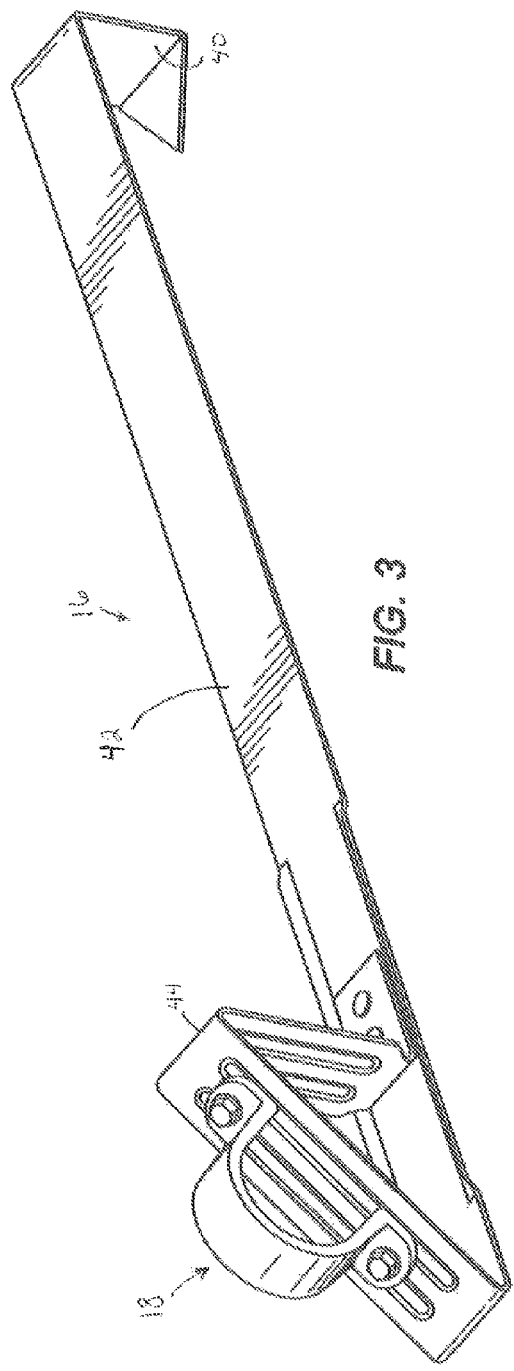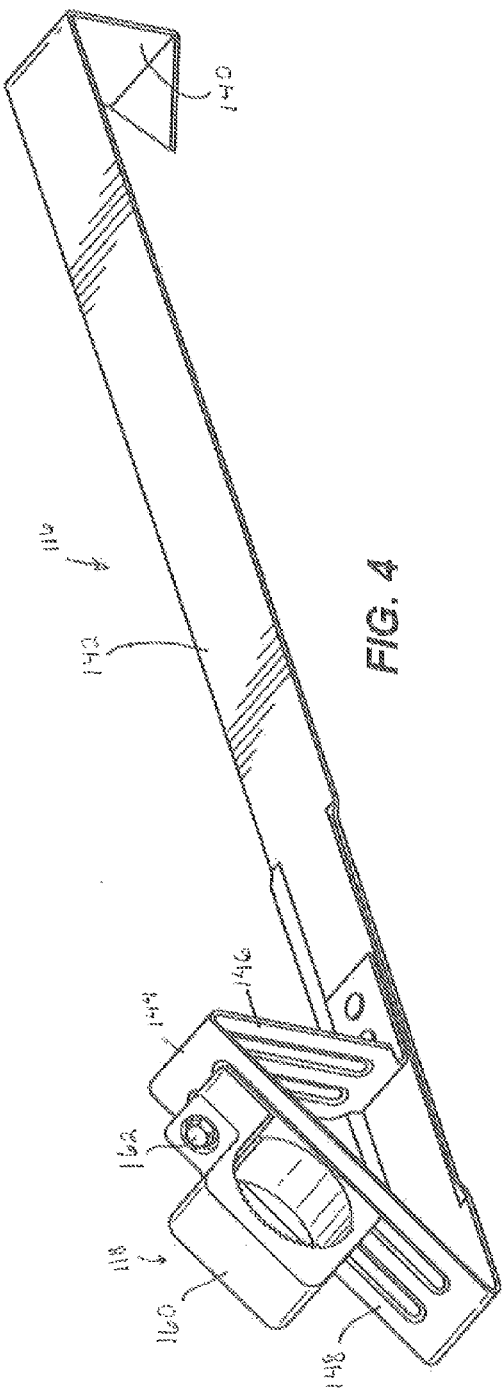
FIG. 3
FIG. 4

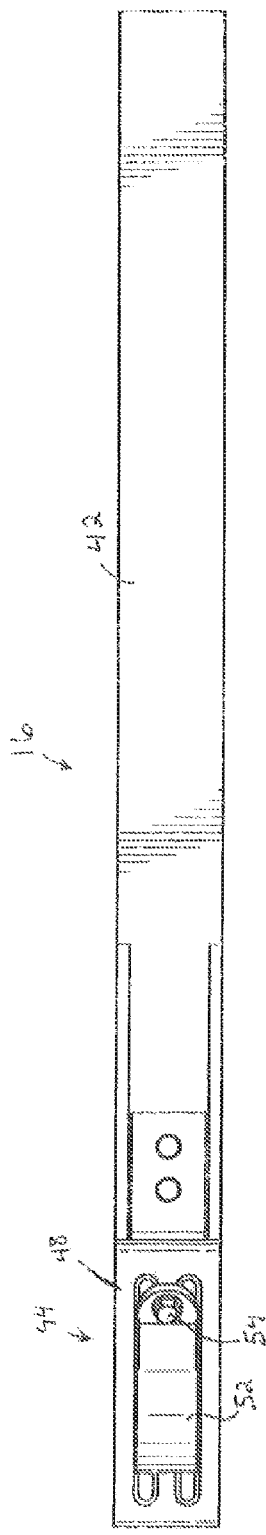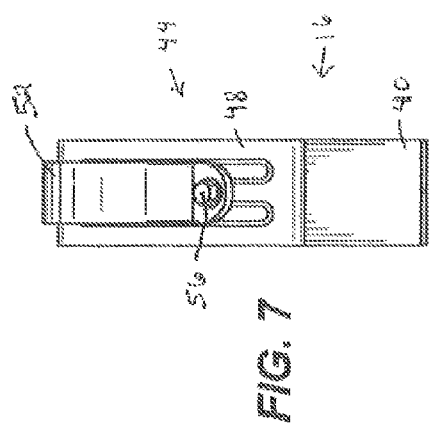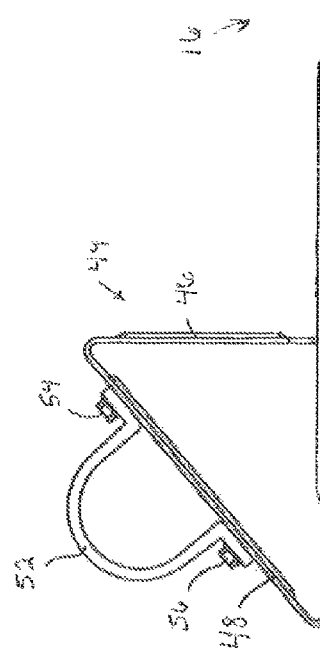

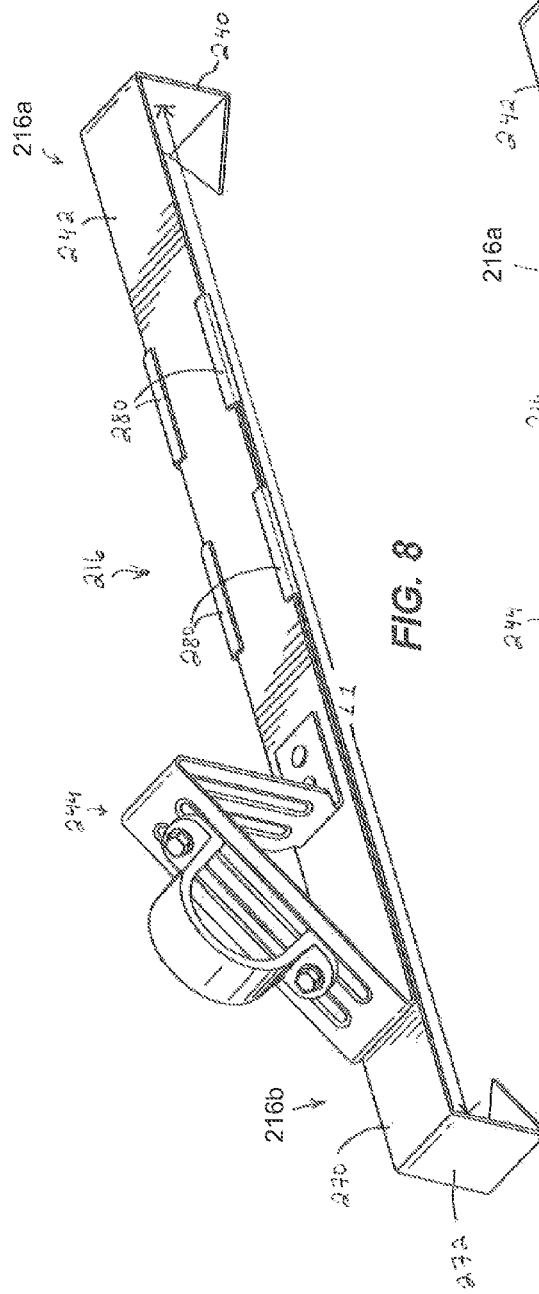
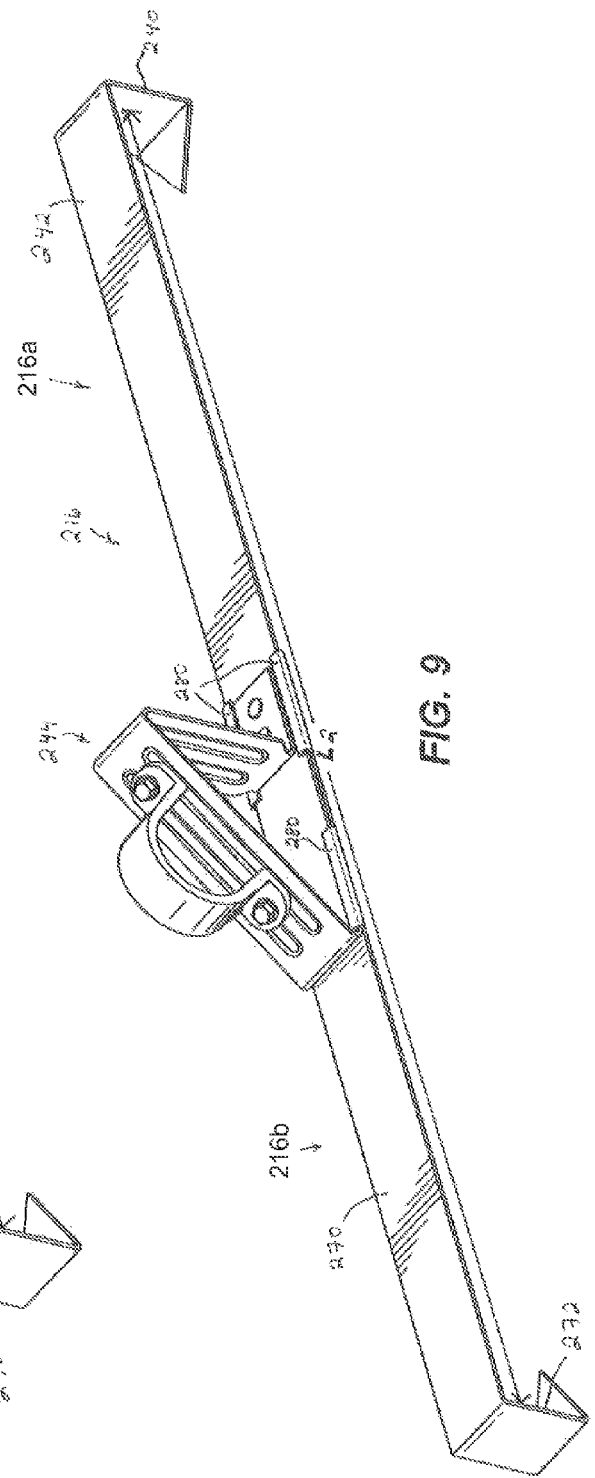

TILE ROOF MOUNT

CROSS-REFERENCE TO RELATED APPLICATIONS

This application claims the benefit of and priority to U.S. Provisional Patent Application No. 62/036,505, filed Aug. 12, 2014, and to U.S. Provisional Patent Application No. 61/935,907, filed Feb. 5, 2014, and to U.S. Provisional Application No. 61/911,987, filed Dec. 4, 2013, the entire contents of all of which are hereby incorporated by reference herein.

BACKGROUND

The present invention relates to a roof mounting system for mounting at least one object above a roof surface.

SUMMARY

A roof mounting system is mounted to roofing tile and is utilized to support one or more components on the roof. The roof mounting system includes a first bracket portion having a first elongate portion, a first hook portion and a first leg opposite the first hook portion. The first hook portion engages a first side of the roofing tile. The roof mounting system also includes a second bracket portion having a second elongate portion, a second hook portion and a second leg opposite the second hook portion. The second hook portion engages a second side of the roofing tile. The roof mounting system further includes a slotted plate connecting the first and the second bracket portions by engaging the first and the second legs. The roof mounting system further includes a standoff connected to one of the first bracket portion or the slotted plate. The standoff supports one or more components on the roof.

A roof mounting system is utilized to support one or more components on a roof. The roof mounting system includes a first bracket portion having a first hook portion sized to engage the roof, and a first leg spaced from the first hook portion. The roof mounting system also includes a second bracket portion having a second hook portion sized to engage the roof, and a second leg spaced from the second hook portion. The roof mounting system further includes a slotted plate having a plurality of slots sized to receive the first and the second legs. The first and the second legs are bendable with respect to the first and the second hook portions. A distance between the first hook portion and the second hook portion is adjustable by positioning the first and the second legs into any of the plurality of slots. The first and the second bracket portions are connected by bending the first and the second legs after the first and the second legs are positioned in respective slots in the slotted plate.

A method of supporting one or more roof mounted components above a roof surface. The method includes positioning a first hook portion around a first edge of a roof tile such that a first elongate portion extends along a surface of the roof tile and that a first leg protrudes above the roof surface, positioning a second hook portion around a second edge of a roof tile such that a second elongate portion extends along the surface of the roof tile and that a second leg protrudes above the roof surface, inserting the first leg into a first slot of a slotted plate, inserting the second leg into a second slot of the slotted plate, bending the first leg toward the slotted plate to connect the first bracket portion and the slotted plate together, and bending the second leg toward the slotted plate to connect the second bracket portion and the slotted plate together. A standoff is located on one of the first bracket portion or the slotted plate. The standoff supports one or more roof mounted components.

Other aspects of the invention will become apparent by consideration of the detailed description and accompanying drawings.

BRIEF DESCRIPTION OF THE DRAWINGS

FIG. 3 is a detailed view of the snow guard and clamp of FIG. 2.

FIG. 4 is a detailed view of the snow guard with an alternative clamp.

FIG. 5 is a top view of the snow guard and clamp of FIGS. 1-3.

FIG. 6 is a side view of the snow guard and clamp of FIGS. 1-3.

FIG. 7 is a front view of the snow guard and clamp of FIGS. 1-3.

FIG. 8 is a perspective view of a snow guard according to some embodiments of the present invention shown in a first position.

FIG. 9 is a perspective view of the snow guard of FIG. 8 shown in a second position.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," etc.) are only used to simplify description of embodiments of the present invention and do not alone indicate or imply that the device or element referred to must have a particular orientation. In addition, terms such as "first" and "second" are used herein for purposes of description and are not intended to indicate or imply relative importance or significance.

Figure 1:
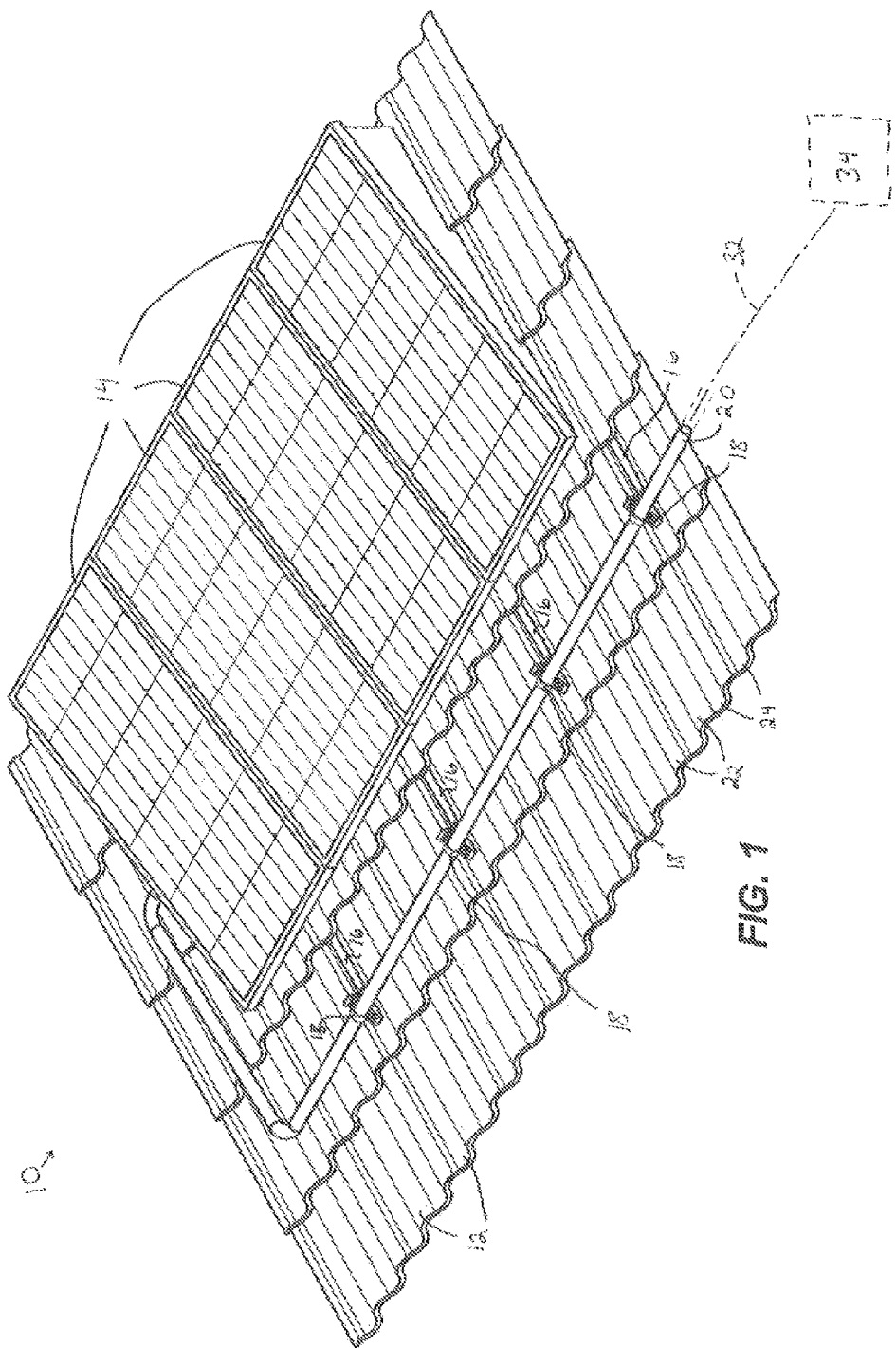
FIG. 1 illustrates a roof with a plurality of solar panels, snow guards and clamps and a conduit supported on the roof surface.
Figure 2:
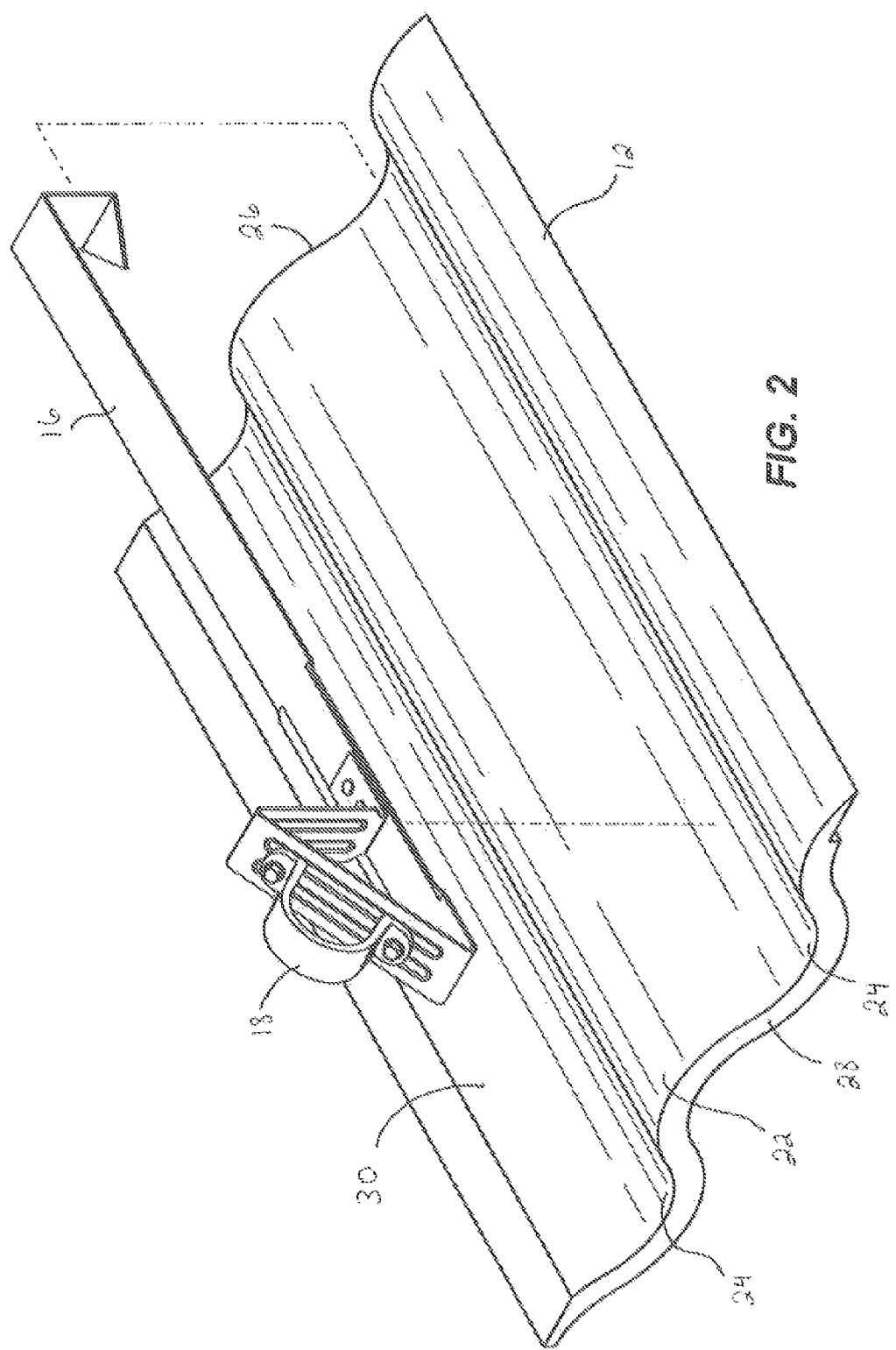
FIG. 2 is a perspective view of the snow guard and clamp exploded from the roof surface.

FIGS. 1-3 illustrate a roof 10 having a plurality of tiles 12, a plurality of solar panels 14, a plurality of snow guards 16, a plurality of clamps 18 and a conduit 20. The illustrated tiles 12 include adjacent peaks 22 and valleys 24. In other embodiments, other shapes and configures of tiles can be utilized. As shown more clearly in FIG. 2, each of the tiles includes a top surface 26 that faces an apex of the roof 10, a bottom surface 28 that faces away from the apex of the roof 10, and a front surface 30 that faces away from the roof surface.

The illustrated solar panels 14 are connected to the roof in an array. As shown in FIG. 1, each of the solar panels 14 has at least one wire 32 that electrically connects the solar panel 14 to an inverter 34. The inverter 34 converts the current from direct current (DC) to alternating current (AC). The inverter 34 can be electrically connected to a circuit breaker, a battery, a power grid or other suitable device. While the illustrated solar panels 14 are connected to one another in series, in other embodiments, the solar panel can be connected in parallel.

The plurality of snow guards 16 are connected to the roof. As shown in greater detail in FIGS. 3 and 5-7, each of the snow guards 16 includes a hook portion 40, an elongate portion 42 and a protruding portion 44. The hook portion 40 engages the top surface 26 of one of the tiles 12 to connect the snow guard 16 to the tile 12. The elongate portion 42 extends along the front surface 30 of one of the tiles 12. In some embodiments, an adhesive can be utilized to adhere the elongate portion 42 to the tile 12. The illustrated tiles 12 include relatively low peaks and high valleys and therefore, the elongate portion 42 extends along one of the valleys 24. However, in other non-illustrated embodiments, the tiles 12 can include higher peaks and lower valleys and therefore, the elongate portion 42 can extend along one of the peaks 22. The first leg 46 extends away from the front surface 30. The illustrated protruding portion 44 includes a first leg 46 that extends substantially perpendicular to the elongate portion 42 and a second leg 48 that extends at a non-parallel angle with respect the elongate portion 42 and the protruding portion 44. In the illustrated embodiment, the second leg 48 is the hypotenuse of a triangle formed between the elongate portion 42, the first leg 46 and the second leg 48.

The illustrated clamp 18 is connected to the second leg 48 of the snow guard 16. The illustrated clamp 18 includes a c-shaped bracket 52 and first and second fasteners 54, 56. The first and second fasteners 54, 56 connect the c-shaped bracket 52 to the second leg 48 of the snow guard 16.

The illustrated conduit 20 is connected to the snow guards 16 by the respective clamps 18. Specifically, the conduit 20 is positioned between the c-shaped bracket 52 and the second leg 48 of the snow guard 16. The conduit 20 extends along a length of the roof 10. The at least one wire 32 extends through the conduit 20. The conduit 20 protects the at least one wire 32 without casting shadows on the solar panels 14 because the snow guards 16 are positioned closer to the tile front surface 30 than the solar panels 14.

The location of the conduit 20 below the solar panels 14, instead of connected to the solar panels 14, allows for easier installation and servicing of the solar panels 14. The solar panels 14 are not mounted to the snow guards 16 but are mounted to the roof 10 on separate brackets. This permits the user to install the snow guards 16 and conduit 20 onto the roof regardless of which solar panel mounting (i.e., track mounted, separate brackets for each solar panel, etc.) is utilized. Additionally, the show guards 16 and conduit 20 do not cast a shadow onto the solar panels 14, so the efficiency of the solar panels 14 can be increased.

FIG. 4 illustrates an alternate clamp 118 that can be utilized with some embodiments of the present invention. The illustrated clamp 118 is connected to a snow guard 116 and includes a d-shaped bracket 160 and a fastener 162. Similar to the snow guard 16, the snow guard 116 includes a hook portion 140, an elongate portion 142 and a protruding portion 144 that includes a first leg 146 and a second leg 148. The fastener 162 connects the d-shaped bracket 160 to the second leg 148 of the snow guard 116. The conduit is encircled by the d-shaped bracket 160 and connected to the second leg 148 of the snow guard 116 by the fastener 162. Other, non-illustrated clamps can be utilized to connect the conduit 20 to the snow guards 16, 116. The illustrated clamps 18, 118 are shown by way of example only.

FIGS. 8-9 illustrate an alternate snow guard 216 that can be utilized with some embodiments of the present invention. The snow guard 216 includes a first snow guard portion 216a and a second snow guard portion 216b. The first snow guard portion 216a includes a first hook portion 240, a first elongate portion 242 and a protruding portion 244. The second snow guard portion 216b includes a second elongate portion 270 and a second hook portion 272. Like the snow guards 16, 116, the first hook portion 240 of the snow guard 216 can engage the top surface of the tile. However, unlike the snow guards 16, 116, the second hook portion 272 can engage the bottom surface of the tile. The snow guard 216 can remain secured to the roof 10 even at high wind velocities because the first and second hook portions 240, 272 affix the snow guard 216 to the tile. Other shapes and configurations of hooks can be utilized in place of the illustrated hook portions 40, 140, 240, 272. The exact shape of the hook portions 40, 140, 240, 272 should generally correspond to the roof to which the respective snow guard 16, 116, 216 is being mounted.

The first elongate portion 242 and the second elongate portion 270 are in a telescoping relationship so that an overall length of the snow guard 216 is adjustable. FIG. 8 shows the snow guard 216 in a first position in which the snow guard 216 has a first length L1.

FIG. 9 shows the snow guard 216 in a second position in which the snow guard 216 has a second length L2, which is greater than the first length L1.

The illustrated second elongate portion 270 includes flanges 280 that wrap around a portion of the first elongate portion 242 to connect the first and second snow guard portions 216a, 216b. The illustrated flanges 280 connect the first and second snow guard portions 216a, 216b and permit relative movement of the first and second snow guard portions 216a, 216b between the first length L1 and the second length L2. If desired, the flanges 280 are deformable by a pliers (or other similar implement) to firmly clamp the first elongate portion 242 and resist relative movement when the snow guard 216 is a desired length. In some embodiments, a fastener is utilized to fix the first and second snow guard portions 216a, 216b together at the desired length. The fastener can be tightened to fix the first and second snow guard portions 216a, 216b when the snow guard 216 is connected to the tile. Other fasteners and fastening configurations can be utilized to fix the first and second snow guard portions 216a, 216b together.

Figure 10:
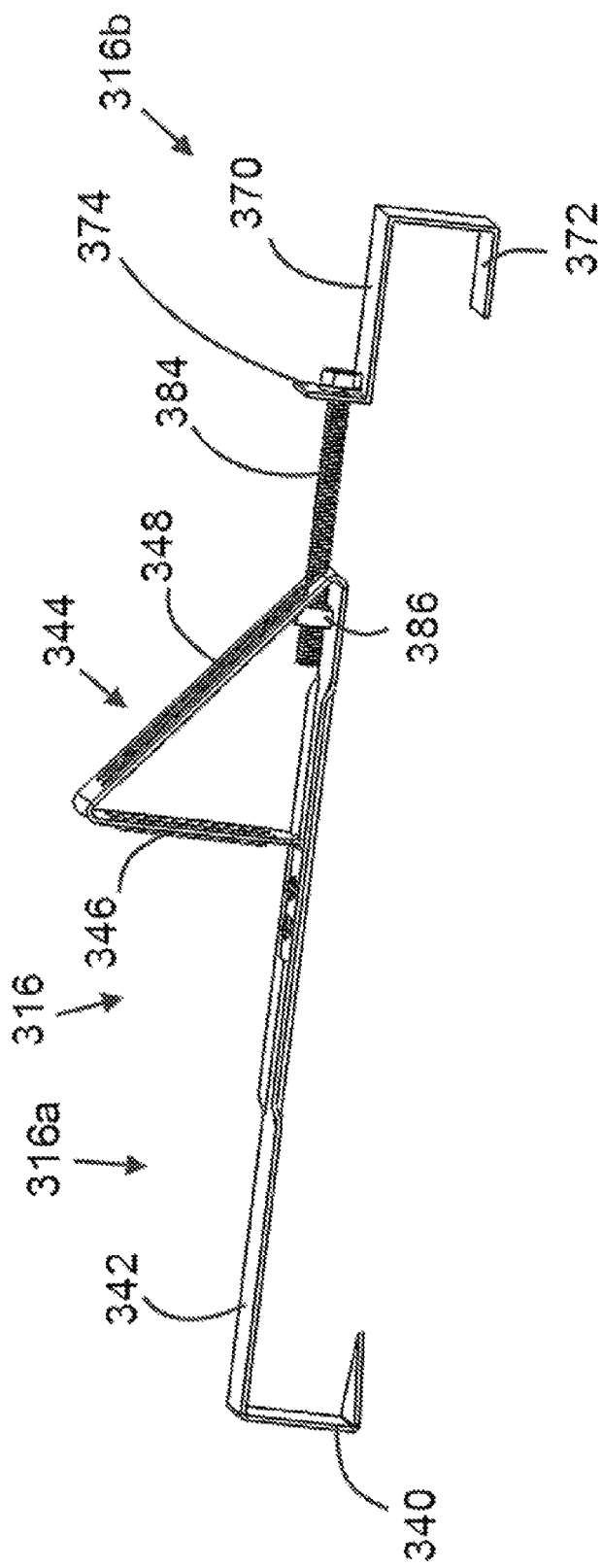
FIG. 10 is a perspective view of a snow guard according to some embodiments of the present invention.
Figure 11:
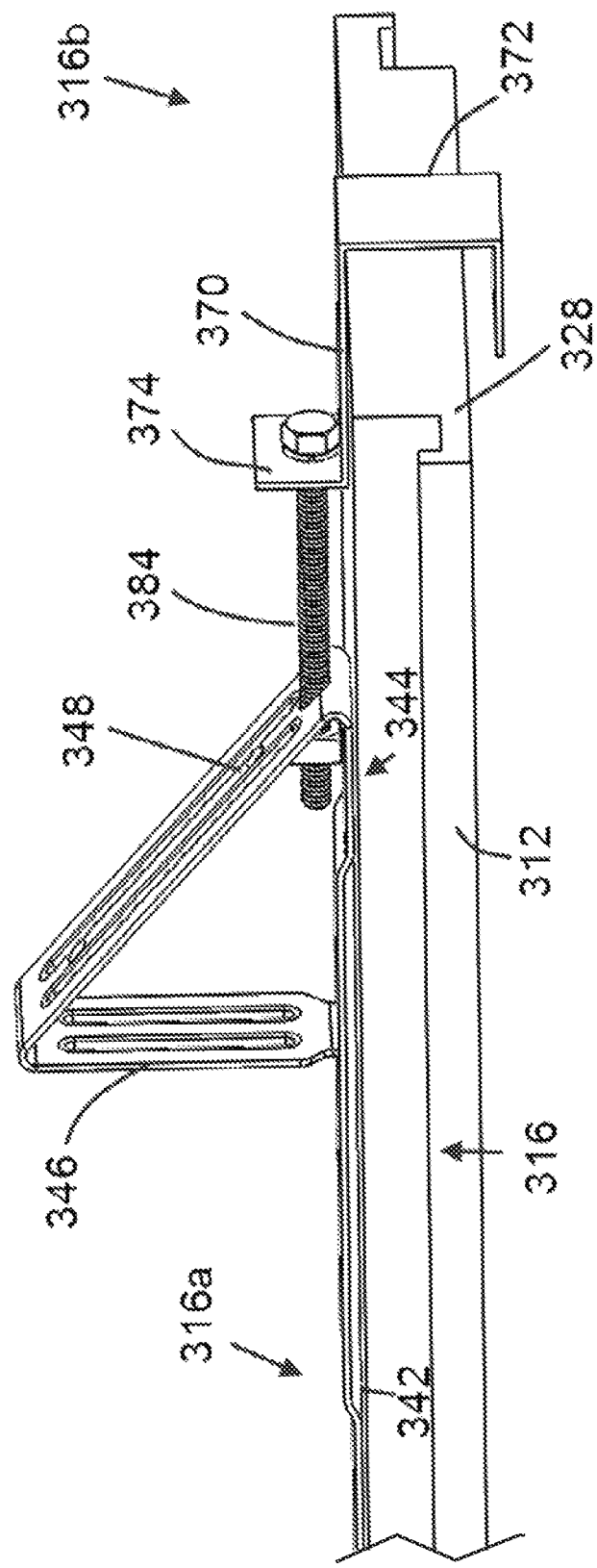
FIG. 11 is a side view of the snow guard of FIG. 10 installed on a roofing tile.
Figure 12:
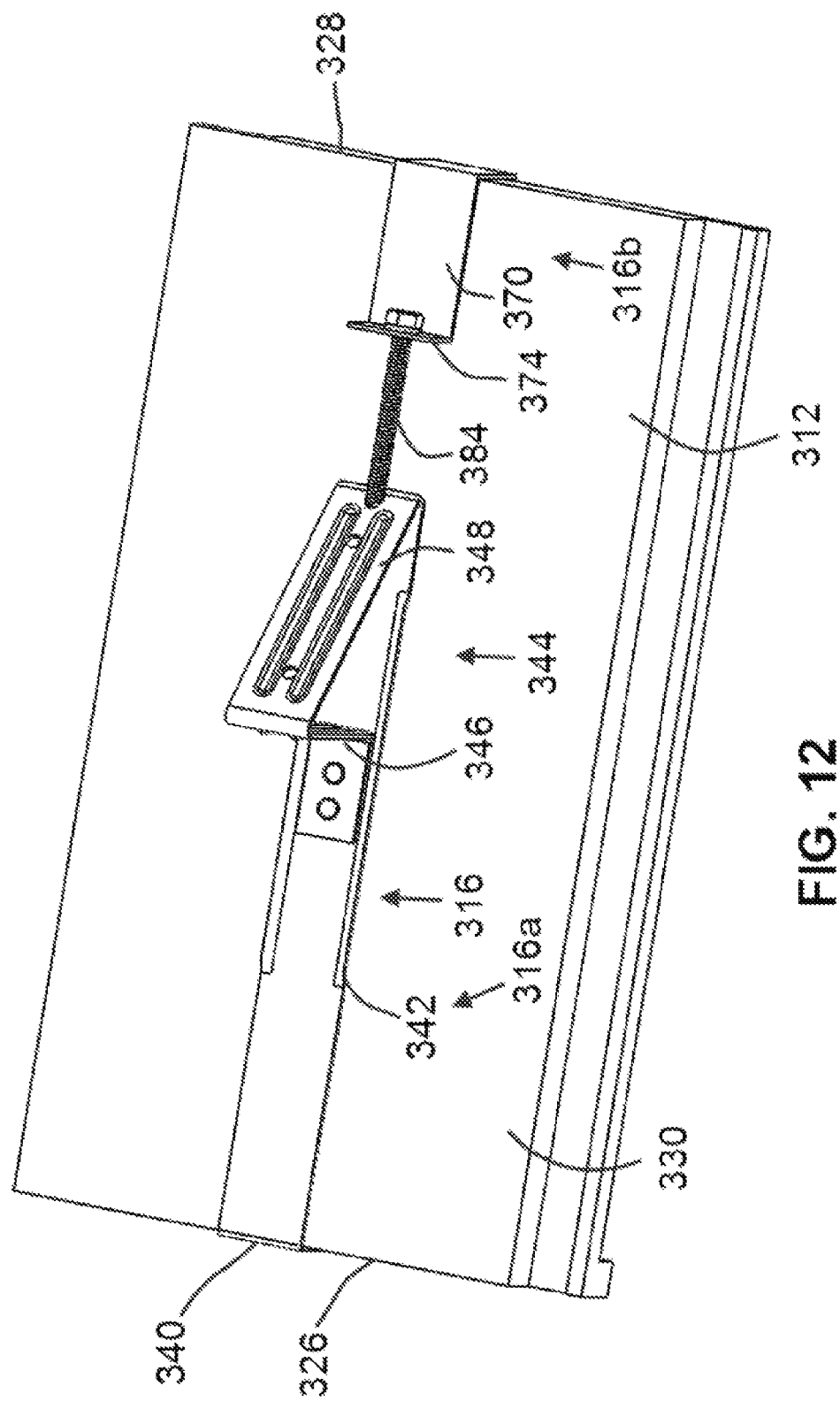
FIG. 12 is a perspective view of the snow guard of FIGS. 10-11 installed on the roofing tile.

FIGS. 10-12 illustrate an alternative embodiment of the snow guard 316 according to some embodiments of the present invention. Like the snow guard 216, the illustrated snow guard 316 includes a first snow guard portion 316a and a second snow guard portion 316b. The first snow guard portion 316a includes a hook portion 340, an elongate portion 342, and a protruding portion 344 that includes a first leg 346 and a second leg 348. Unlike the snow guards 16, 116, 216, the snow guard 316 includes a bolt 384 and nut 386 connected to the protruding portion 344 at a first end and to the snow guard second portion 316b at a second end. The second snow guard portion 316b includes a second hook portion 372, a second elongate portion 370, and a second leg 374 that defines an aperture through which the bolt 384 extends.

The illustrated nut 386 is a square nut and engages the protruding portion 344 of the snow guard 316 to resist rotation of the square nut 386 while a user tightens the bolt 384. Therefore, the user only needs to use one hand and one tool to tighten the nut 386 and bolt 384. Other sizes, shapes and configurations of fasteners can be utilized in place of the illustrated nut 386 and bolt 384.

The first hook portion 340 engages a top surface 326 of a tile 312 and the second hook portion 372 engages a bottom surface 328 of the tile 312. The elongate portions 342, 370 rest on a front surface 330 of the tile 312. The snow guard 316 can be used to clamp North-South or East-West on the tile. While the illustrated tile 312 is flat, the snow guard 316 can be utilized on a non-flat roof. Specifically, the first and second elongate portions 342, 370 can extend along a peak or a valley of a corrugated tile roof. Like the snow guard 216, the snow guard 316 can be adjusted to different overall lengths and can clamp firmly onto the tile 312 to be connected to the tile 312 even in high winds or under the weight of substantial snow fall. The snow guard 316 can be firmly connected to a roof that is substantially horizontal or to a roof that is angled with respect to horizontal.

Figure 13:
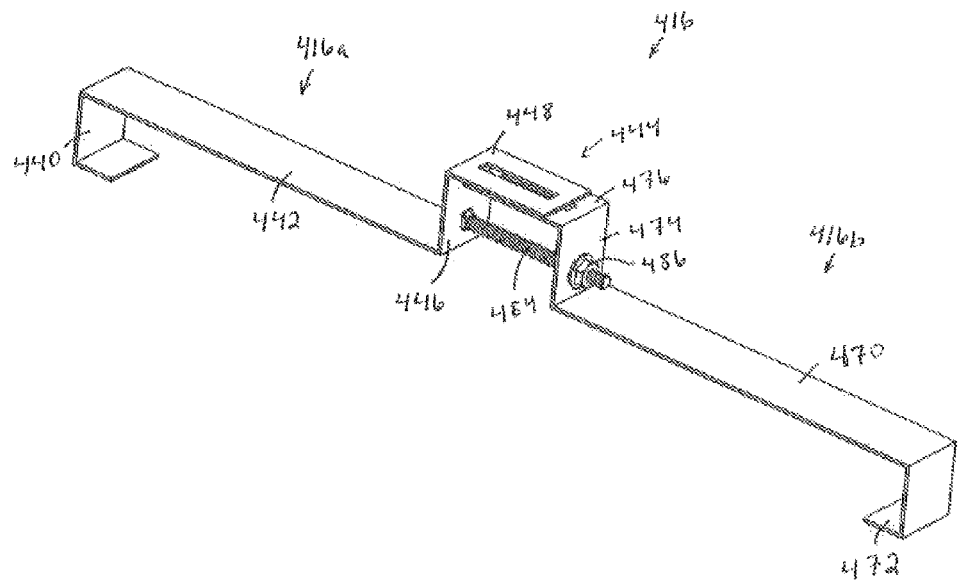
FIG. 13 is a perspective view of a roof mounting bracket according to some embodiments of the present invention.
Figure 14:
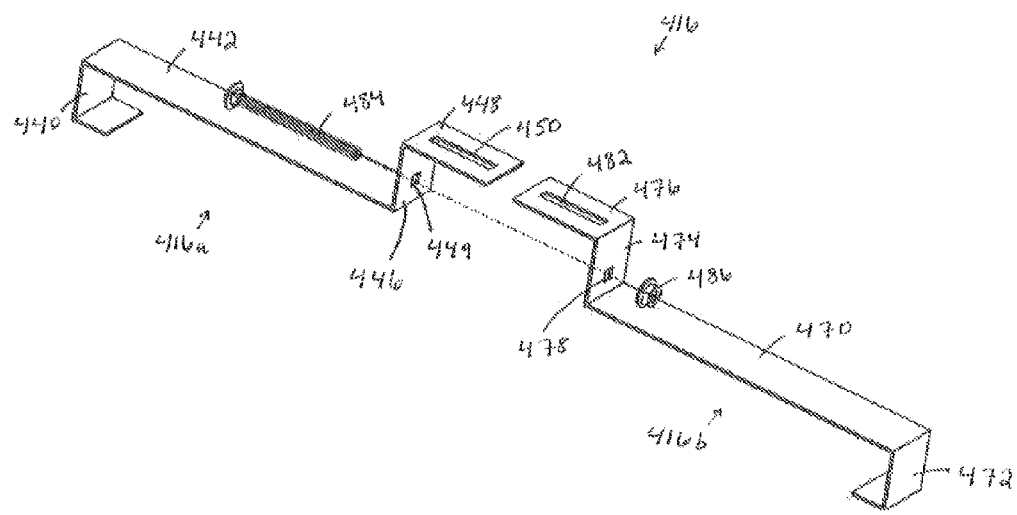
FIG. 14 is an exploded view of the roof mounting bracket of FIG. 13.

FIGS. 13 and 14 illustrate a roof mounting bracket 416 that can function both as a snow guard and a support for one or more roof-mounted fixtures. The illustrated roof mounting bracket 416 includes a first bracket portion 416a and a second bracket portion 416b that are connected with a bolt 484 and a nut 486. In the illustrated embodiment, the first bracket portion 416a is a substantial mirror image of the second bracket portion 416b. However, in other embodiments, the first and second bracket portions can differ in size, shape and/or configuration.

The first bracket portion 416a includes a first hook portion 440, a first elongate portion 442 and first and second legs 446, 448. The first leg 446 defines an aperture 449 through which the bolt 484 extends. In the illustrated embodiment, the aperture 449 and the bolt 484 define a square cross section. Therefore, the bolt 484 resists rotating when the nut 486 is tightened onto the bolt 484. The second leg 448 defines a slot 450 through which a fastener can extend to support a roof-mounted fixture above the roof mounting bracket 416.

The second bracket portion 416b includes a second hook portion 472, a second elongate portion 470, and third and fourth legs 474, 476. The first and second legs 446, 448 and the third and fourth legs 474, 476 form the protruding portion 444. The third leg 474 defines an aperture 478 through which the bolt 484 extends. The fourth leg 476 defines a slot 482 through which a fastener can extend to support a roof-mounted fixture above the roof mounting bracket 416. In some embodiments, the first and second bracket portions 416a and 416b can be substantially identical mirror-images.

The illustrated roof mounting bracket 416 can be mounted to a tile roof like the other snow guards and brackets illustrated herein. The roof mounting bracket 416 can extend North-South or East-West along the roof surface. The slots 450 and 482 allow a variety of sizes of roof mounted fixtures, such as a connection point between adjacent portions of conduit, to be supported on the roof mounting bracket 416. In some embodiments, conduit, water lines or other roof-run hardware can be positioned between the protruding portion 444 and the roof surface. While the illustrated protruding portion 444 forms a substantially rectangular shape, in other embodiments, the protruding portion can have a square, circular, triangular, or other suitable shape.

Figure 15:
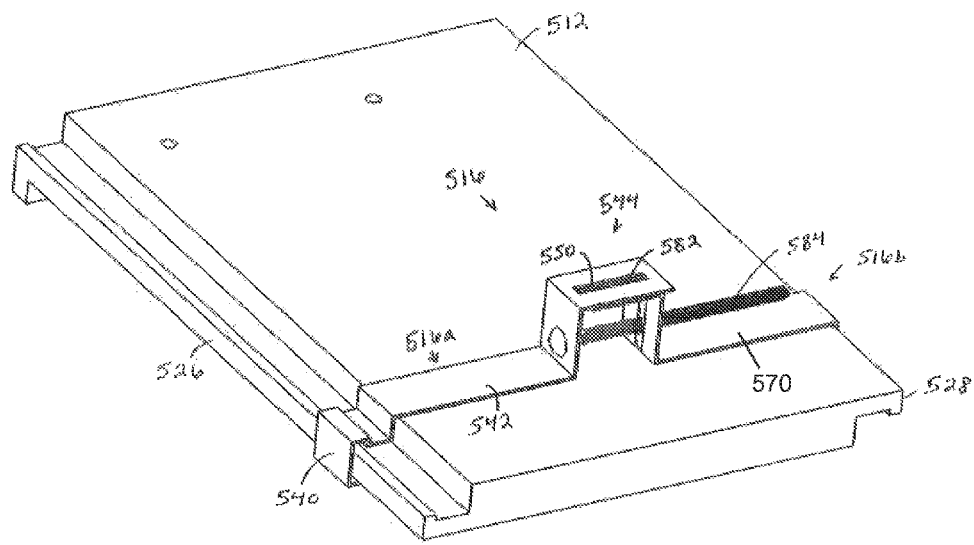
FIG. 15 is a perspective view of a roof mounting bracket according to some embodiments of the present invention.
Figure 16:
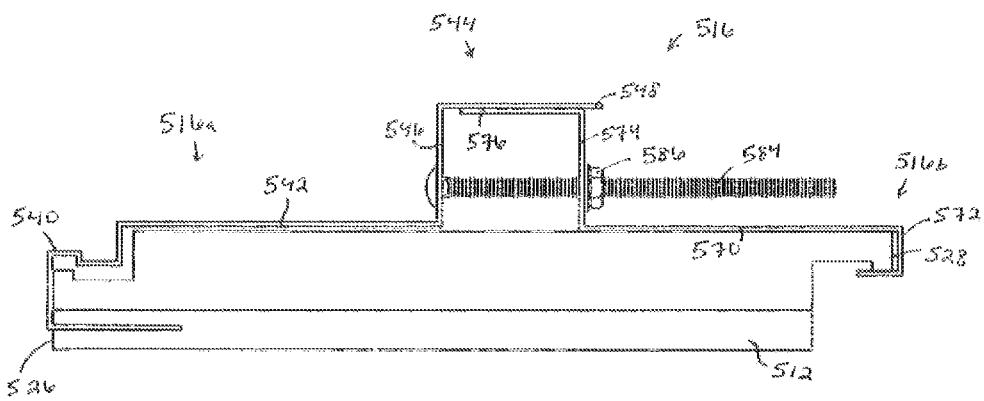
FIG. 16 is a side view of the roof mounting bracket of FIG. 15.

FIGS. 15 and 16 illustrate a roof mounting bracket 516 that can function both as a snow guard and a support for one or more roof-mounted fixtures. The illustrated roof mounting bracket 516 includes a first bracket portion 516a and a second bracket portion 516b that are connected with a bolt 584 and a nut 586.

The first bracket portion 516a includes a first hook portion 540, a first elongate portion 542 and first and second legs 546, 548. The first leg 546 defines an aperture through which the bolt 584 extends. Although not specifically illustrated, the aperture in the first leg 546 and the bolt 584 can define a square cross section. Therefore, the bolt 584 can resist rotating when the nut 586 is tightened onto the bolt 584. The second leg 548 defines a slot 550 through which a fastener can extend to support a roof-mounted fixture above the roof mounting bracket 516.

The second bracket portion 516b includes a second hook portion 572, a second elongate portion 570, and third and fourth legs 574, 576. The first and second legs 546, 548 and the third and fourth legs 574, 576 form the protruding portion 544. The third leg 574 defines an aperture through which the bolt 584 extends. Although not specifically illustrated, the aperture in the third leg 574 can define a square cross section. In these embodiments, the positions of the nut 586 and bolt 584 can be switched and bolt 584 can resist rotating when the nut 586 is tightened onto the bolt 584. The fourth leg 576 defines a slot 582 through which a fastener can extend to support a roof-mounted fixture above the roof mounting bracket 516.

The illustrated roof mounting bracket 516 is mounted to a tile 512. The first hook portion 540 wraps around a first side surface 526 of the tile 512. The first hook portion 540 is shaped to substantially conform to the irregular shape of the first side surface 526. The irregularities formed in the illustrated tile 512 are rain channels that direct rain to flow off of the roof surface. The second hook portion 572 wraps around a second side surface 528 of the tile 512. The first and second elongate portions 542 and 570 are positioned on the front surface 530 of the tile 512. The first and second portions 516a, 516b can be shaped to conform to the tile surface. In other embodiments, this can include various bumps, protrusions, slots or other irregularities that are formed by the tile(s).

The roof mounting bracket 516 can extend North-South or East-West along the roof surface. The slots 550, 582 allow a variety of sizes of roof mounted fixtures, such as a connection point between adjacent portions of conduit, to be supported on the roof mounting bracket 516. In some embodiments, conduit, water lines or other roof-run hardware can be positioned between the protruding portion 544 and the roof surface. While the illustrated protruding portion 544 forms a substantially rectangular shape, in other embodiments, the protruding portion can have a square, circular, triangular, or other suitable shape.

FIGS. 17-20 illustrate a roof mounting bracket 616 that can function both as a snow guard and a support for one or more roof-mounted fixtures. The illustrated roof mounting bracket 616 includes a first bracket portion 616a and a second bracket portion 616b that are connected with a bolt 684 and a nut 686.

The first bracket portion 616a includes a first hook portion 640, a first elongate portion 642 and a first leg 646. The first leg 646 defines an aperture through which the bolt 684 extends. Although not specifically illustrated, the aperture in the first leg 646 and the bolt 684 can define a square cross section. Therefore, the bolt 684 can resist rotating when the nut 686 is tightened onto the bolt 684.

The second bracket portion 616b includes a second hook portion 672, a second elongate portion 670, and a second leg 674. The second leg 674 defines an aperture through which the bolt 684 extends. Although not specifically illustrated, the aperture in the second leg 674 can define a square cross section. In these embodiments, the positions of the nut 686 and bolt 684 can be switched and bolt 684 can resist rotating when the nut 686 is tightened onto the bolt 684.

In the illustrated embodiment, a standoff 690 includes a slot 692 and is connected to the first elongate portion 642. Specifically, a fastener 694 extends through the slot 692 and engages a nut 696 to connect the standoff 690 to the first elongate portion 642. The illustrated standoff 690 is generally Z-shaped and includes a first leg 690a, a second leg 690b and a third leg 690c. The first leg 690a defines the slot 692 and contacts the first elongate portion 642. The second leg 690b extends substantially perpendicular to the first leg 690a. The third leg 690c extends substantially parallel to the first leg 690a and is operable to support any of a number of roof mounted fixtures.

Figure 17:
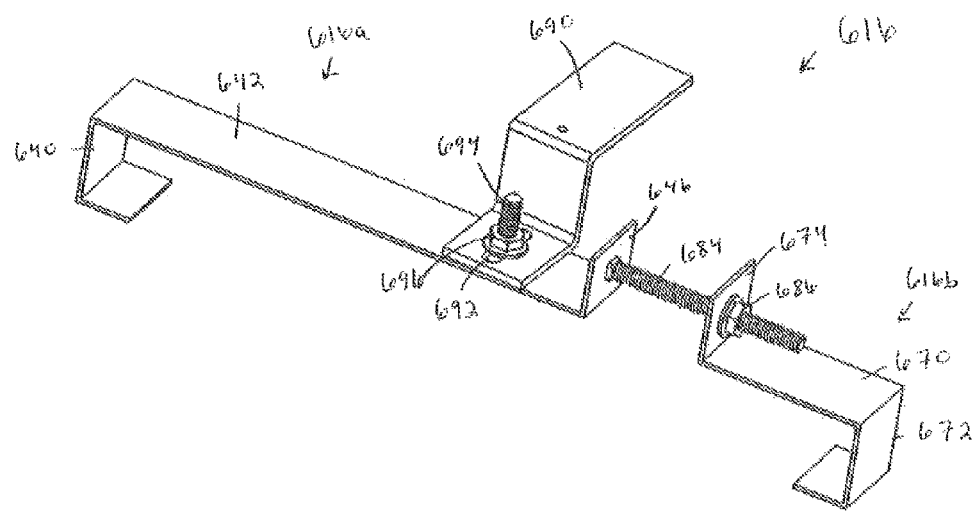
FIG. 17 is a perspective view of a roof mounting bracket according to some embodiments with a standoff in a first position.
Figure 18:
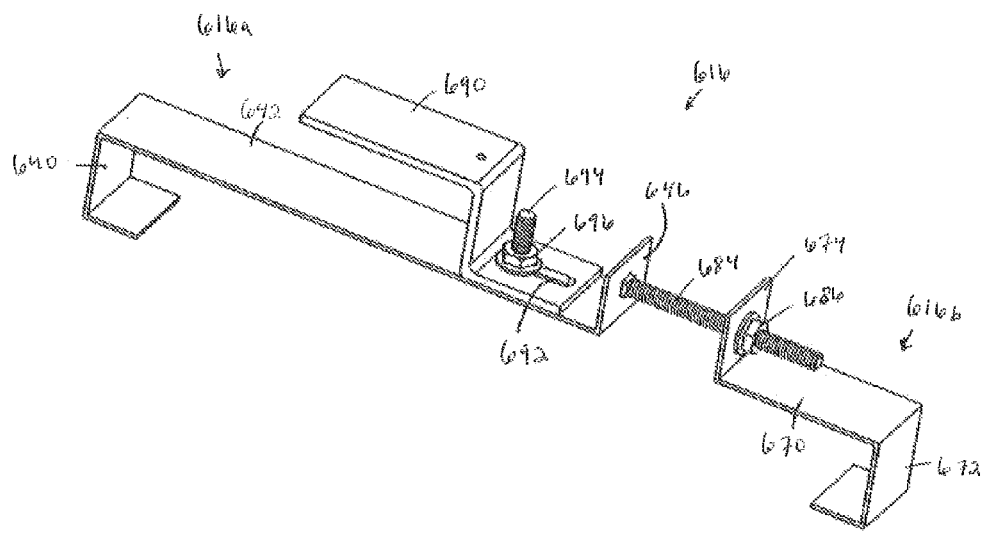
FIG. 18 is a perspective view of the roof mounting bracket of FIG. 17 with the standoff in a second position.
Figure 19:
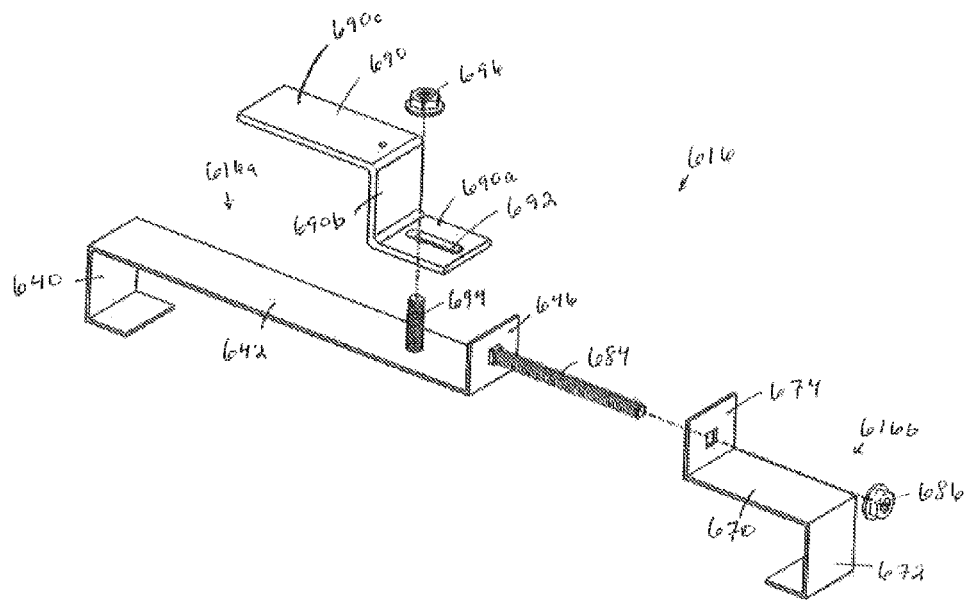
FIG. 19 is an exploded view of the roof mounting bracket and standoff of FIGS. 17 and 18.

The standoff 690 rotates to any position necessary for installation. FIG. 17 shows the standoff 690 extending perpendicular to the first and second elongate portions 642, 670. FIG. 18 shows the standoff 690 extending parallel to the first and second elongate portions 642, 670.

Figure 20:
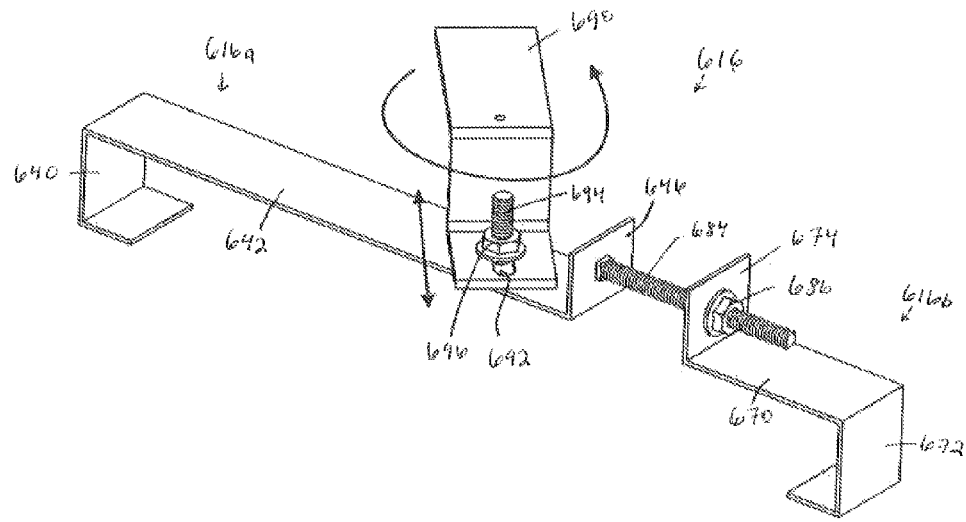
FIG. 20 is a perspective view of the roof mounting bracket and standoff of FIGS. 17-19.

FIG. 20 illustrates that the standoff 690 can rotate with respect to the first and second elongate portions 642, 670, as well as move along the first and second elongate portions 642, 670 as the fastener 694 travels along the slot 692. The fastener 694 can be a press in stud, a square neck style, or any other fastener having some other self-clinching feature that allows the installer to tighten it using only one hand.

A conduit can be attached to the standoff 690 using a standard conduit clamp, a U bolt, or other suitable clamping feature. While the illustrated third leg 690c includes one aperture, any suitable number of apertures can be defined by the third leg 690c to accommodate any of a number of roof mounted fixtures. The illustrated embodiment shows one hole pre-drilled, but other embodiments can include a clamp built into the standoff 690 to accommodate any size conduit. In some embodiments, the first leg 690a can be fastened to the first elongate portion 642 using a rivet that allows the standoff 690 to rotate but keep its attachment point (i.e., by not sliding along the first elongate portion 642). In some embodiments, conduit, water lines or other roof-run hardware can be positioned between the third leg 690c of the standoff 690 and the roof surface. Other shapes of standoffs can be utilized with the present invention, such as square, rectangular, circular, triangular, etc, and the Z-shaped standoff is shown by way of example only.

Figure 21:
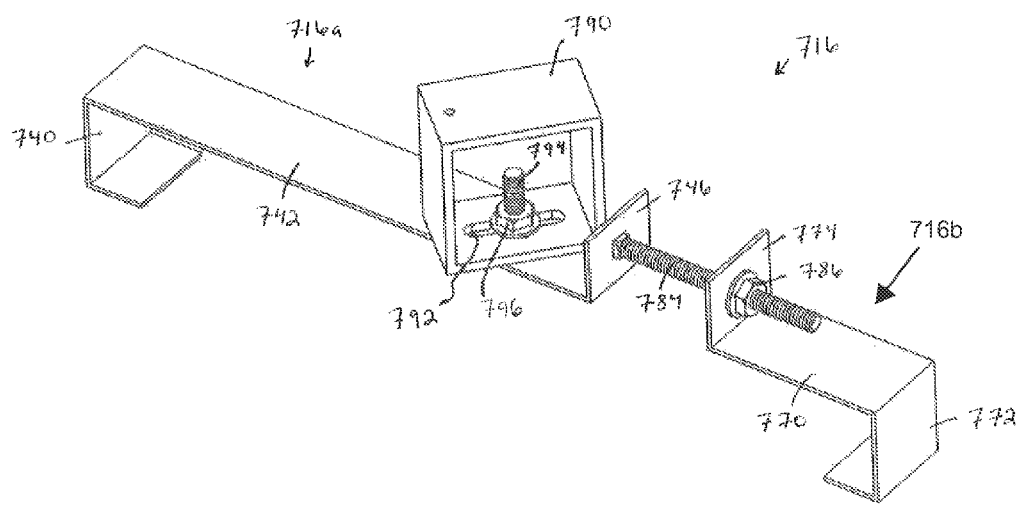
FIG. 21 is a perspective view of a roof mounting bracket according to some embodiments with a standoff.
Figure 22:
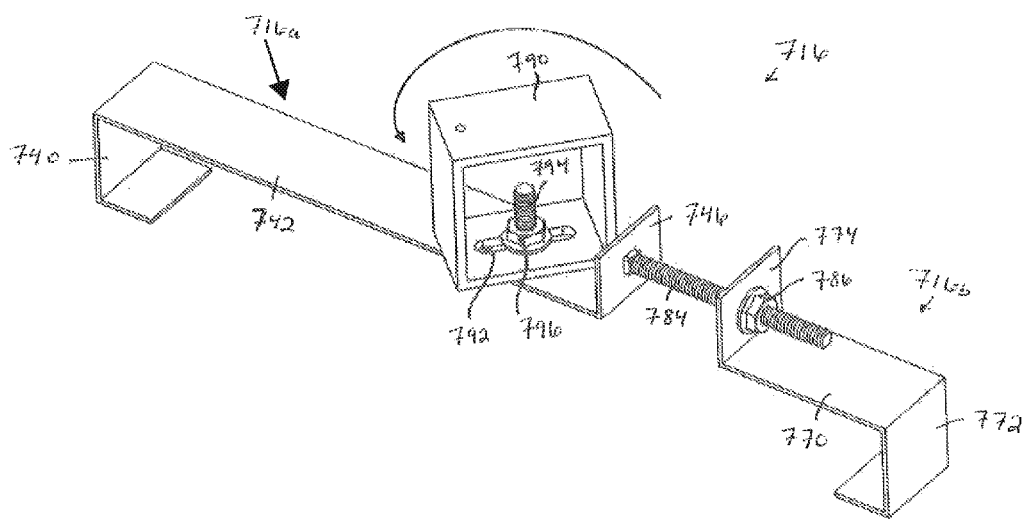
FIG. 22 is a perspective view of the roof mounting bracket and standoff of FIG. 21.
Figure 23:
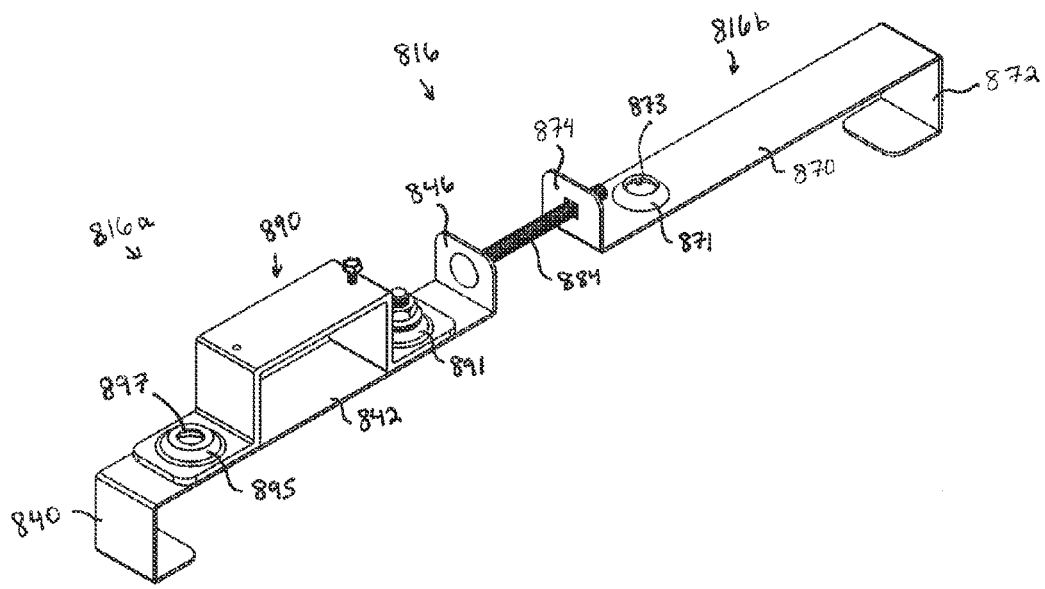
FIG. 23 is a perspective view of a roof mounting bracket according to some embodiments of the present invention with a standoff in a first position.
Figure 24:
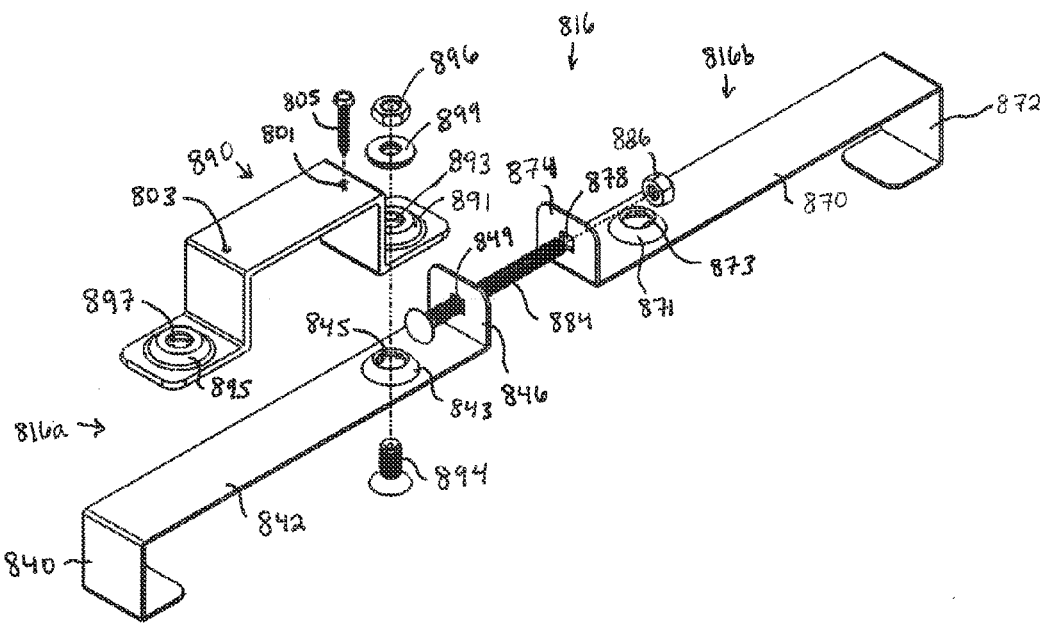
FIG. 24 is an exploded view of the roof mounting bracket of FIG. 23.
Figure 25:
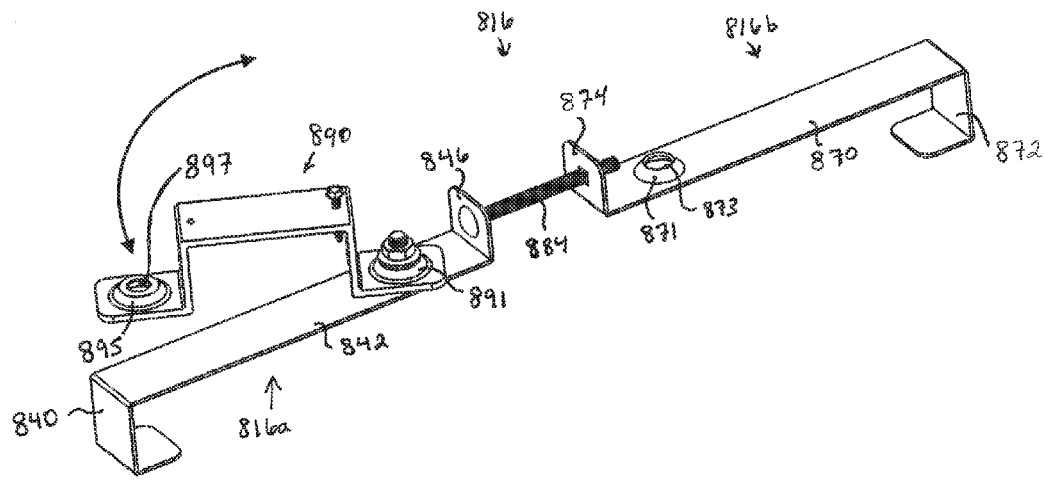
FIG. 25 is a perspective view of the roof mounting bracket of FIGS. 23 and 24 with the standoff in a second position.
Figure 26:
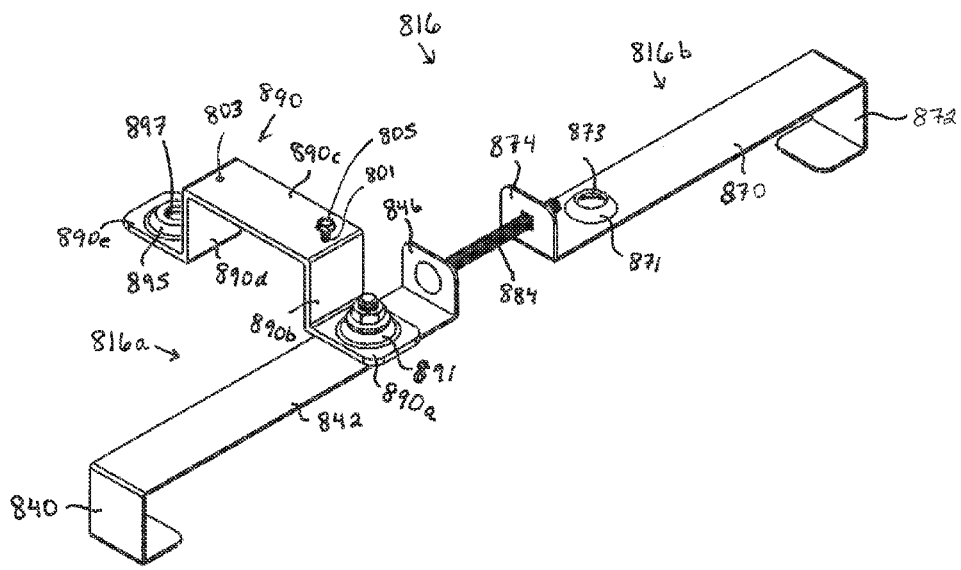
FIG. 26 is a perspective view of the roof mounting bracket of FIGS. 23-25 with the standoff in a third position.

FIGS. 21 and 22 illustrate a roof mounting bracket 716 that can function both as a snow guard and a support for one or more roof-mounted fixtures. The illustrated roof mounting bracket 716 includes a first bracket portion 716a and a second bracket portion 716b that are connected with a bolt 784 and a nut 786.

The first bracket portion 716a includes a first hook portion 740, a first elongate portion 742 and a first leg 746. The first leg 746 defines an aperture through which the bolt 784 extends. Although not specifically illustrated, the aperture in the first leg 746 and the bolt 784 can define a square cross section. Therefore, the bolt 784 can resist rotating when the nut 786 is tightened onto the bolt 784.

The second bracket portion 716b includes a second hook portion 772, a second elongate portion 770, and a second leg 774. The second leg 774 defines an aperture through which the bolt 784 extends. Although not specifically illustrated, the aperture in the second leg 774 can define a square cross section. In these embodiments, the positions of the nut 786 and bolt 784 can be switched and bolt 784 can resist rotating when the nut 786 is tightened onto the bolt 784.

In the illustrated embodiment, a standoff 790 includes a slot 792 and is connected to the first elongate portion 742. Specifically, a fastener 794 extends through the slot 792 and engages a nut 796 to connect the standoff 790 to the first elongate portion 742. The illustrated standoff 790 is square-shaped. A bottom portion of the standoff 790 defines the slot 792 and contacts the first elongate portion 742. The illustrated standoff 790 extends vertically upward from the first elongate portion 742. A top portion of the standoff 790 extends substantially parallel to the first elongate portion 742 and is operable to support any of a number of roof mounted fixtures.

The standoff 790 rotates to any position necessary for installation. FIG. 22 illustrates that the standoff 790 can rotate with respect to the first elongate portion 742, as well as move along the first elongate portion 742 as the fastener 794 travels along the slot 792. The fastener 794 can be a press in stud, a square neck style, or any other fastener having some other self-clinching feature that allows the installer to tighten it using only one hand.

A conduit can be attached to the standoff 790 using a standard conduit clamp, a U bolt, or other suitable clamping feature. While the illustrated standoff 790 includes one aperture in the top portion, any suitable number of apertures can be defined by the top portion to accommodate any of a number of roof mounted fixtures. Some embodiments can include a clamp built into the standoff 790 to accommodate any size conduit. The standoff 790 could be fastened to the first elongate portion 742 using a rivet that allows the standoff 790 to rotate but keep its attachment point (i.e., by not sliding along the first elongate portion 742). In some embodiments, conduit, water lines or other roof-run hardware can extend through the square-shaped standoff 790 to be connected to the roof surface without the use of additional brackets or mounting mechanism(s). Other shapes of standoffs can be utilized with the present invention, such as rectangular, circular, triangular, etc., and the square-shaped standoff is shown by way of example only.

Figure 27:
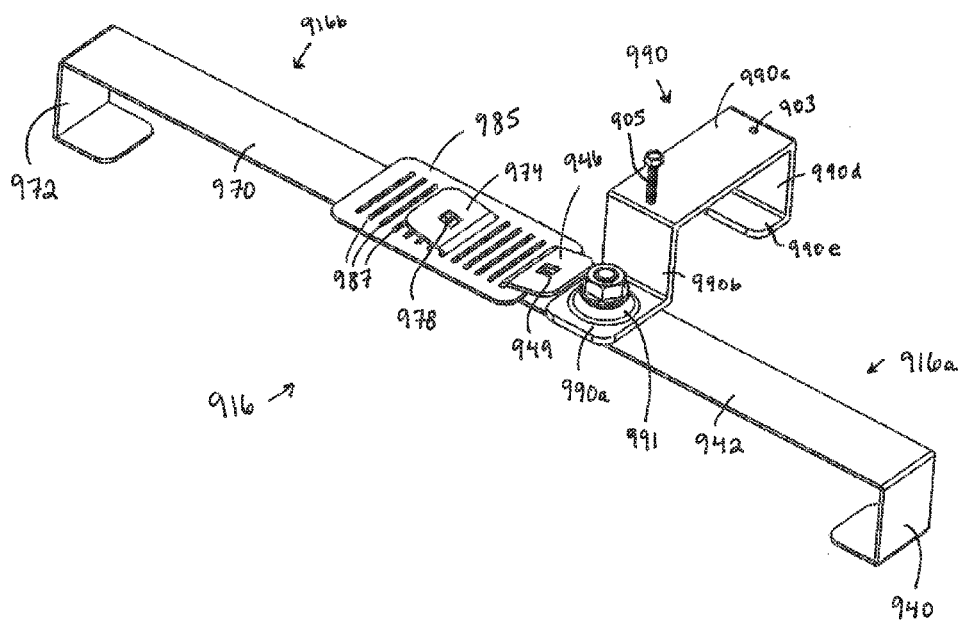
FIG. 27 is a first perspective view of a roof mounting bracket according to some embodiments of the present invention with a standoff in a first position.
Figure 28:
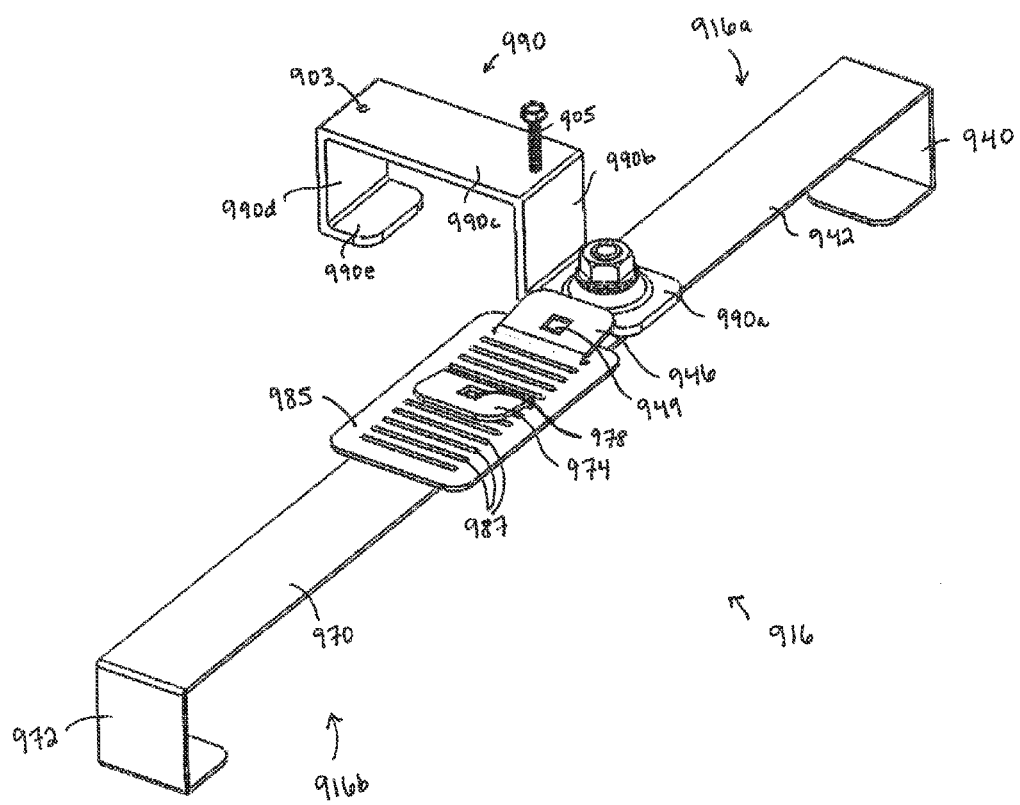
FIG. 28 is a second perspective view of the roof mounting bracket of FIG. 27.
Figure 29:
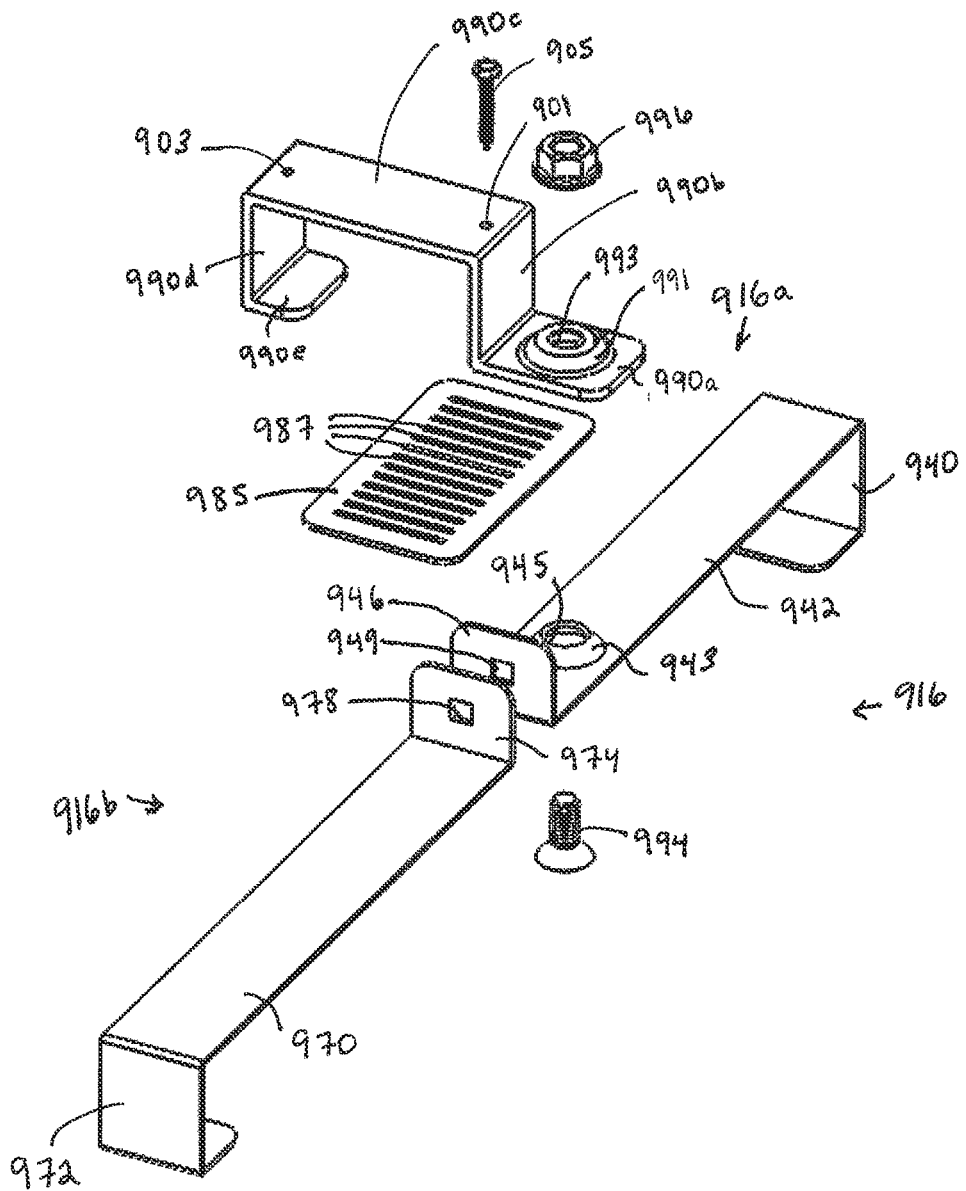
FIG. 29 is an exploded view of the roof mounting bracket of FIGS. 27 and 28.

FIGS. 27-29 illustrate a roof mounting bracket 916 that can function both as a snow guard and a support for one or more roof-mounted fixtures. The illustrated roof mounting bracket 916 includes a first bracket portion 916a and a second bracket portion 916b that are connected by a plate 985 that has a plurality of slots 987. In the illustrated embodiment, the plate 985 is a slotted plate.

The first bracket portion 916a includes a first hook portion 940, a first elongate portion 942 and a first leg 946. The illustrated first leg 946 defines a square aperture 949, but the first leg 946 can include other sizes and shapes of apertures or omit the aperture 949 entirely. The first elongate portion 942 includes a first protrusion 943 that has a substantially frustoconical shape that defines a central aperture 945.

The second bracket portion 916b includes a second hook portion 972, a second elongate portion 970, and a second leg 974. The second leg 974 defines an aperture 978, but the second leg 974 can include other sizes and shapes of apertures or omit the aperture 978 entirely. The illustrated second elongate portion 916b is substantially planar.

In the illustrated embodiment, the first bracket portion 916a and the second bracket portion 916b are substantially identical except for the first protrusion 943 and the central aperture 945 in the first bracket portion 916a. Other shapes and configurations in addition to or in lieu of the first protrusion 943 and the central aperture 945 can be defined by the first and/or second elongate portions 916a, 916b.

In the illustrated embodiment, a standoff 990 includes a first leg 990a, a second leg 990b extending substantially perpendicular to the first leg 990a, a third leg 990c extending substantially parallel to the first leg 990a, a fourth leg 990d extending substantially parallel to the second leg 990b and a fifth leg 990e extending substantially parallel to the first leg 990a.

The standoff 990 defines a frustoconical protrusion 991 having a central aperture 993 in the first leg 990a. In the illustrated embodiment, the frustoconical protrusion 991 is connected to first protrusion 943 in the first elongate portion 942. Specifically, a fastener 994 extends through the central apertures 945 and 993 and engages a nut 996 to connect the standoff 990 to the first elongate portion 942.

The illustrated standoff 990 extends vertically upward from the first elongate portion 942. FIGS. 27-29 show the standoff 990 extending perpendicular to the first and second elongate portions 942, 970, but the standoff 990 rotates to any position necessary for installation. In some embodiments, the fastener 994 can be a press in stud, a square neck style, or any other fastener having some other self-clinching feature that allows the installer to tighten it using only one hand.

The illustrated third leg 990c includes first and second apertures 901 and 903. In the illustrated embodiment, a fastener 905 extends through the first aperture 901. Other locations and quantities of apertures can be defined by the third leg 990c to accommodate any of a number of roof mounted fixtures. A conduit can be attached to the standoff 990 using a standard conduit clamp, a U bolt, or other suitable clamping feature. Some embodiments can include a clamp built into the standoff 990 to accommodate any size conduit. The standoff 990 could be fastened to the first elongate portion 942 using a rivet that allows the standoff 990 to rotate but keep its attachment point (i.e., by not sliding along the first elongate portion 942). In some embodiments, conduit, water lines or other roof-run hardware can be positioned between the third leg 990c of the standoff 990 and the roof surface. Other shapes of standoffs can be utilized with the present invention, such as square, rectangular, circular, triangular, etc, and the standoff is shown by way of example only.

The plate 985 connects the first bracket portion 916a to the second bracket portion 916b. The plurality of slots 987 permit adjustment of the distance between the first hook portion 940 and the second hook portion 972. For example, the user inserts the first leg 946 into one of the plurality of the slots 987 and then bends the first leg 946 downwardly toward the first elongate portion 942. Additionally, the user inserts the second leg 974 into another one of the plurality of slots 987 and then bends the second leg 974 downwardly toward the second elongate portion 970. The user can adjust the distance between the first hook portion 940 and the second hook portion 972 by selecting the appropriate slots 987. The user can bend the first and second legs 946, 974 downwardly by hand or by using one or more tools.

Figure 30:
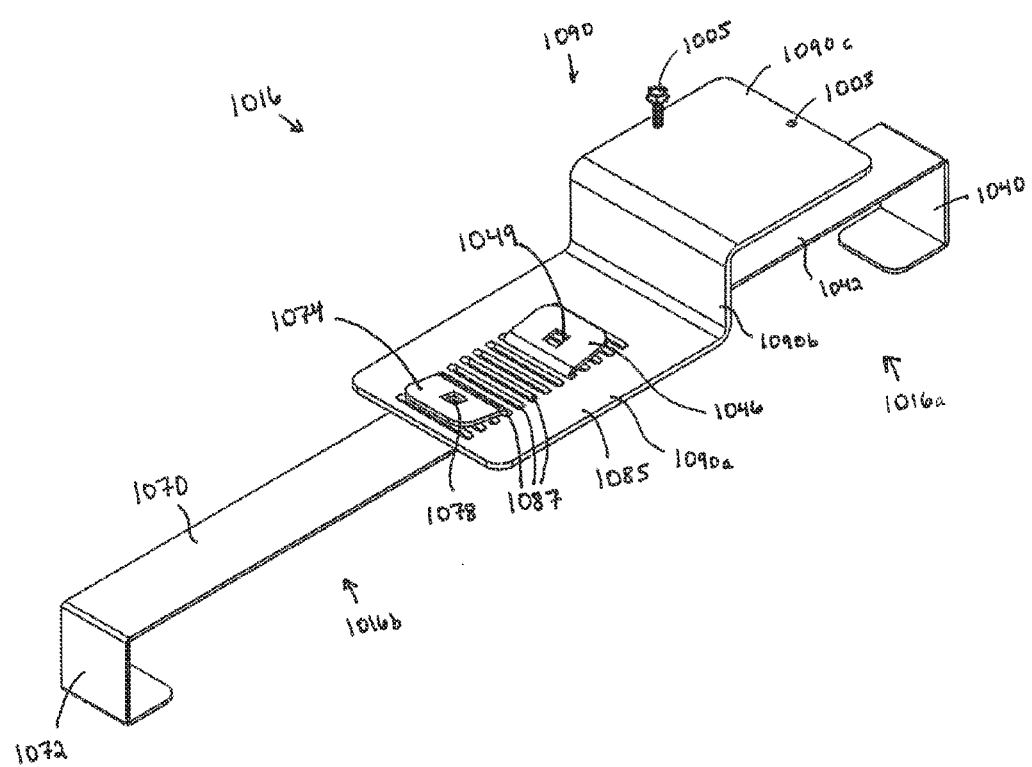
FIG. 30 is a perspective view of a roof mounting bracket according to some embodiments of the present invention.
Figure 31:
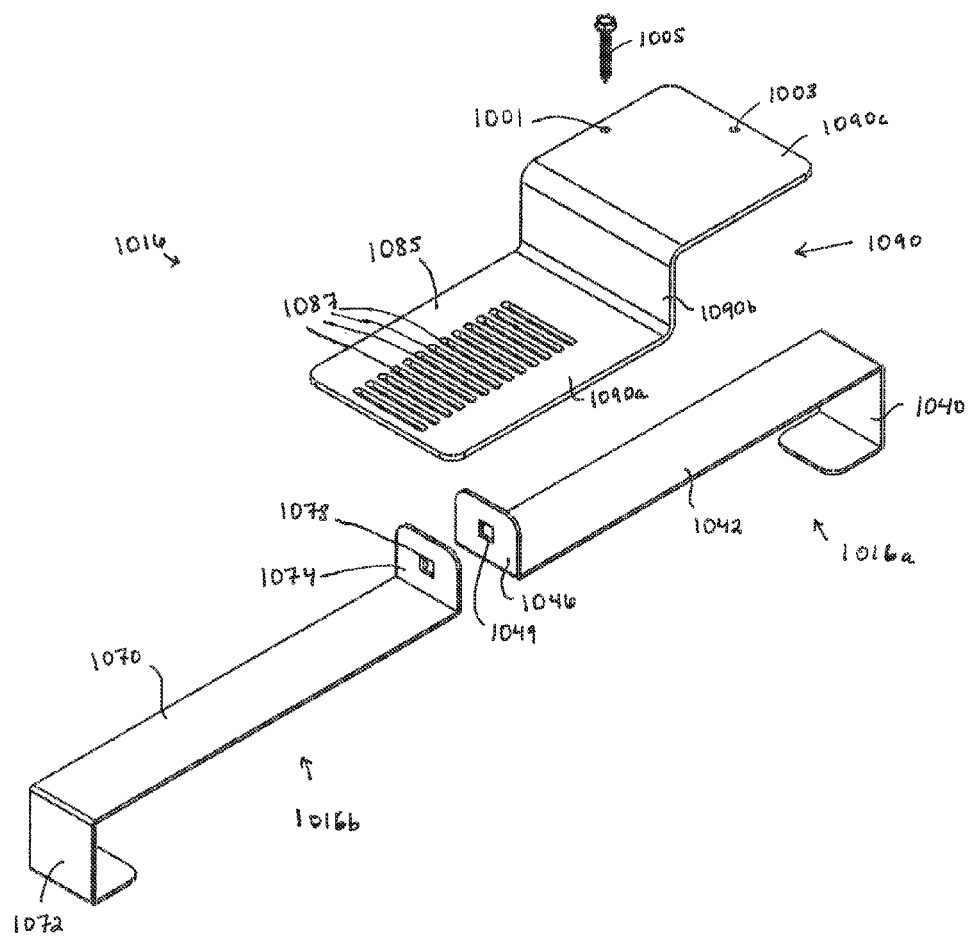
FIG. 31 is an exploded view of the roof mounting bracket of FIG. 30.

FIGS. 30 and 31 illustrate a roof mounting bracket 1016 that can function both as a snow guard and a support for one or more roof-mounted fixtures. The illustrated roof mounting bracket 1016 includes a first bracket portion 1016a and a second bracket portion 1016b that are connected by a plate 1085 that has a plurality of slots 1087. In the illustrated embodiment, the plate 1085 is a slotted plate.

The first bracket portion 1016a includes a first hook portion 1040, a first elongate portion 1042 and a first leg 1046. The first leg 1046 defines an aperture 1049. The illustrated first leg 1046 defines a square aperture 1049, but the first leg 1046 can include other sizes and shapes of apertures or omit the aperture 1049 entirely.

The second bracket portion 1016b includes a second hook portion 1072, a second elongate portion 1070, and a second leg 1074. The second leg 1074 defines an aperture 1078 but the second leg 1074 can include other sizes and shapes of apertures or omit the aperture 1078 entirely.

In the illustrated embodiment, the first bracket portion 1016a and the second bracket portion 1016b are substantially identical. One or more projections, recesses and apertures can be included in either or both of the first and second bracket portions 1016a, 1016b in other embodiments.

In the illustrated embodiment, a standoff 1090 is generally Z-shaped and includes a first leg 1090a that comprises the plate 1085, a second leg 1090b and a third leg 1090c. The first leg 1090a defines the plurality of slot 1087 that receive the first and second legs 1046, 1074 of the first and second bracket portions 1016a, 1016b. The second leg 1090b extends substantially perpendicular to the first leg 1090a. The third leg 1090c extends substantially parallel to the first leg 1090a and is operable to support any of a number of roof mounted fixtures.

The illustrated third leg 1090c includes first and second apertures 1001 and 1003. In the illustrated embodiment, a fastener 1005 extends through the first aperture 1001. Other locations and quantities of apertures can be defined by the third leg 1090c to accommodate any of a number of roof mounted fixtures. A conduit can be attached to the standoff 1090 using a standard conduit clamp, a U bolt, or other suitable clamping feature. Some embodiments can include a clamp built into the standoff 1090 to accommodate any size conduit. In some embodiments, conduit, water lines or other roof-run hardware can be positioned between the third leg 1090c of the standoff 1090 and the roof surface. Other shapes of standoffs can be utilized with the present invention, such as square, rectangular, circular, triangular, etc, and the standoff is shown by way of example only.

The plate 1085 of the standoff 1090 connects the first bracket portion 1016a to the second bracket portion 1016b. The plurality of slots 1087 permit adjustment of the distance between the first hook portion 1040 and the second hook portion 1072. For example, the user inserts the first leg 1046 into one of the plurality of the slots 1087 and then bends the first leg 1046 downwardly toward the first elongate portion 1042. Additionally, the user inserts the second leg 1074 into another one of the plurality of slots 1087 and then bends the second leg 1074 downwardly toward the second elongate portion 1070. The user can adjust the distance between the first hook portion 1040 and the second hook portion 1072 by selecting the appropriate slots 1087. The user can bend the first and second legs 1046, 1074 downwardly by hand or by using one or more tools.

The snow guards 16, 116, 216, 316, and roof mounting brackets 416, 516, 616, 716, 816, 916, 1016 provide an easy, non-penetrating ways of running conduit, water lines, or other types of roof-run hardware along a roof surface.

The present invention discloses, among other things, using a snow guard to mount conduit for a solar panel to a roof surface. The snow guard can function as both a snow guard and a conduit mounting bracket. This permits the drilling of fewer holes in a roof surface while still achieving the functionality of solar panels and/or snow guards.

The invention claimed is:

1. A roof mounting system mounted to roofing tile, the roof mounting system is operable to support one or more components on the roof, the roof mounting system comprising:
a first bracket portion including a first elongate portion, a first hook portion and a first leg opposite the first hook portion, the first hook portion configured to engage a first side of the roofing tile;
a second bracket portion including a second elongate portion, a second hook portion and a second leg opposite the second hook portion, the second hook portion configured to engage a second side of the roofing tile;
a slotted plate engageable with the first and the second legs to connect the first and second bracket portions; and
a standoff configured to support one or more components on the roof.

2. The roof mounting system of claim 1, wherein the slotted plate includes a plurality of slots, the first leg is insertable into a first slot of the plurality of slots and the second leg is insertable into a second slot of the plurality of slots.

3. The roof mounting system of claim 2, wherein one of the first leg and the second leg is insertable into a third slot of the plurality of slots such that a distance between the first and the second hook portions is adjustable.

4. The roof mounting system of claim 3, wherein the first and the second legs are bendable over the slotted plate to inhibit disassembly of the first bracket portion, the second bracket portion, and the slotted plate.

5. The roof mounting system of claim 4, wherein the first leg includes a first aperture and the second leg includes a second aperture.

6. The roof mounting system of claim 1, wherein the standoff includes a first leg, a second leg, and a third leg, the first and the third standoff legs are substantially parallel to each other, the second standoff leg is substantially perpendicular to the first and the third standoff legs, and the first standoff leg is in contact with the first bracket portion.

7. The roof mounting system of claim 6, wherein the slotted plate is formed by the first standoff leg.

8. The roof mounting system of claim 1, wherein the standoff is rotatable relative to the first bracket portion.

9. The roof mounting system of claim 1, wherein the standoff is configured to support roof-run hardware.

10. A roof mounting system operable to support one or more components on a roof, the roof mounting system comprising:
a first bracket portion including a first hook portion sized to engage the roof, and a first leg spaced from the first hook portion;
a second bracket portion including a second hook portion sized to engage the roof, and a second leg spaced from the second hook portion; and
a slotted plate including a plurality of slots sized to receive the first and the second legs, the first and the second legs adapted to be bent with respect to the first and the second hook portions,
wherein a distance between the first hook portion and the second hook portion is adjustable by positioning the first and the second legs into any of the plurality of slots, wherein the first bracket portion and the slotted plate are coupled together by bending the first leg toward the slotted plate after the first leg is positioned in a first slot of the plurality of slots, and wherein the second bracket portion and the slotted plate are coupled together by bending the second leg toward the slotted plate after the second leg is positioned in a second slot of the plurality of slots.

11. The roof mounting system of claim 10, further includes a standoff configured to support one or more components.

12. The roofing mounting system of claim 11, wherein the standoff is configured to support roof-run hardware.

13. The roof mounting system of claim 11, wherein the standoff includes a first leg, a second leg, and a third leg, the first and the third standoff legs are substantially parallel to each other and the second standoff leg is substantially perpendicular to the first and the third standoff legs, and wherein the first standoff leg is in contact with the first bracket portion.

14. The roof mounting system of claim 11, wherein the standoff is rotatable relative to the first bracket portion.

15. The roof mounting system of claim 13, wherein the slotted plate is formed by the first standoff leg.

16. A method of supporting one or more roof mounted components above a roof surface, the method comprising:
positioning a first hook portion around a first edge of a roof tile such that a first elongate portion extends along a surface of the roof tile and that a first leg protrudes above the roof surface;
positioning a second hook portion around a second edge of a roof tile such that a second elongate portion extends along the surface of the roof tile and that a second leg protrudes above the roof surface;
inserting the first leg into a first slot of a slotted plate;
inserting the second leg into a second slot of the slotted plate;

bending the first leg toward the slotted plate to couple the first bracket portion and the slotted plate together;

bending the second leg toward the slotted plate to couple the second bracket portion and the slotted plate together; and positioning a standoff on one of the first bracket portion and the slotted plate, wherein the standoff is configured to support one or more roof mounted components.

17. The method of claim 16, further comprising providing a first aperture on the first leg and a second aperture on the second leg, wherein the first and the second apertures are configured to receive a tool to bend the respective first and the second legs toward the slotted plate.

18. The method of claim 17, wherein positioning the standoff includes coupling the standoff to the first bracket portion and rotatably positioning the standoff relative to the first bracket portion.

19. The method of claim 17, wherein positioning the standoff includes forming the slotted plate on a portion of the standoff.

20. The method of claim 17, further comprising supporting roof-run hardware with the standoff.

* * * * *